United States Patent [19]

Feldstein

[11] Patent Number: 5,379,502
[45] Date of Patent: Jan. 10, 1995

[54] METHODS FOR FABRICATING BATTERY PLATES FOR LEAD/ACID BATTERIES

[75] Inventor: Robert S. Feldstein, Pelham, N.Y.
[73] Assignee: Derafe, Ltd., Buffalo, N.Y.
[21] Appl. No.: 74,358
[22] Filed: Jun. 10, 1993
[51] Int. Cl.$^6$ ............................................. H01M 4/04
[52] U.S. Cl. ...................................... 29/2; 427/419.2
[58] Field of Search .................... 29/2; 427/123, 419.2

[56] References Cited

U.S. PATENT DOCUMENTS 4,939,051  7/1990  Yasuda et al. ...................... 29/2 X

FOREIGN PATENT DOCUMENTS 58-198860  11/1983  Japan ........................................ 29/2
59-149652  8/1984  Japan ........................................ 29/2

OTHER PUBLICATIONS

XA-200: Proposed Hybrid Electric Vehicle ... Lead Acid Battery (1991) Eskra et al; Johnson Controls Inc., *ISATA Conference Paper*, pp. 305–311 (month na).
*Design News*, Oct. 21, 1991; Electric Vehicle Race Gathers Momentum; Iverson.
Publisher Unknown, Date Unknown; Fischetti; Here Comes The Electric Car . . . ; pp. 34–43.
*Popular Mechanics*, Sep. 1991; New Age EV; Shuldiner; pp. 27–29 & 102.
*Popular Mechanics*, Sep. 1991; Battery Chargers; Allen pp. 30, 31.
*Toronto Star*, Aug. 15, 1993; Batteries at GM ... Run Down Fast Oscar Suris (Dow Jones).

Primary Examiner—Stephen Kalafut
Attorney, Agent, or Firm—Donald E. Hewson

[57] ABSTRACT

Methods for fabricating battery plates for lead/acid batteries are provided. The battery plates that are fabricated may be positive plates, negative plates, or bipolar plates. The principal active constituent of the battery plates is elemental lead in the case of negative plates, lead oxide in the case of positive plates, or elemental lead on one face and lead oxide on the other face of bipolar plates. In any event, the battery plate comprises a thin layer of lead (which may later be oxidized, at least at its surface), where the thin layer of lead is surface treated so as to form a plurality of closely spaced depressions therein. By the surface treatment, the exposed active surface area of the plate is increased to at least 150% of its projected area. The surface treatment may be by embossing the lead, or micro-machining the lead using a laser. When the plate is a bipolar plate, a core element is provided between a pair of opposed thin layers of lead, one of which will subsequently be oxidized. The pre-formed core element generally comprises titanium (or chromium) facing the lead and lead oxide active surfaces. The titanium may be adhered to an inner core of copper or beryllium-copper. Lead is placed on the titanium such as by the repeated steps of spraying lead to a thickness of 30 to 100 atoms thick, annealing the structure, and spraying further lead, and again annealing at a lower temperature each time, until the surface comprises substantially pure annealed lead.

19 Claims, 1 Drawing Sheet

METHODS FOR FABRICATING BATTERY PLATES FOR LEAD/ACID BATTERIES

FIELD OF THE INVENTION

This invention relates to methods for fabricating battery plates, particularly for use in lead/acid batteries. In use, particularly in lead/acid batteries, the plates have active surface areas of lead or lead oxide, and are exposed to sulphuric acid within the battery cell containment. The present invention is particularly directed to lead/acid batteries that may be used as the power source batteries in electric vehicles, or in other circumstances such as standby battery applications.

BACKGROUND OF THE INVENTION

It is said that, in future, automotive transport will look much more closely to, and rely more upon, electrically powered vehicles. Electric vehicles are essentially zero-emission vehicles, which is to say that they are non-polluting at the power consumption point, and it is intended that current shortcomings of electrical vehicles should be overcome as quickly as possible. Among those shortcomings is the fact that batteries to be used for electric vehicles may comprise as much as 20% to 30% of the weight of the vehicle. That means, in turn, that the power delivered by the batteries must be such that it can move not only the vehicle and its passengers, but the weight of the batteries themselves. Moreover, even in city and light highway traffic conditions, an electric vehicle must be expected to accelerate in a manner similar to a conventional vehicle powered by an internal combustion engine, which means either that there must be excess battery capacity on board the vehicle to provide fast current delivery for vehicle acceleration, or that the batteries must be designed with a high ratio of active material surface to volume so as to be able to provide high power densities. Such demands may be similar to cranking power requirements in ordinary vehicles, but the demands may occur much more frequently and be of longer duration in each instance.

Moreover, electrically powered vehicles must have batteries that are capable of being recharged very quickly. While battery recharging is outside the scope of this invention, it is evident that just as the batteries must be designed so as to be able to deliver high current, quickly, so also must they be designed to absorb high recharging current, quickly. Still further, the choice of batteries in various experimental and low-production electric vehicle programs currently under way throughout the world has demanded consideration of various battery types, operating at various voltage levels.

Among the battery types presently under consideration for use in electric vehicles are nickel-cadmium batteries, which however are very expensive, environmentally undesirable, and tend to self-discharge. Moreover, nickel-cadmium batteries may exhibit a memory effect, in that they must be substantially fully discharged before they are recharged; otherwise, such batteries may develop a rate-limited "memory" phenomenon whereby they tend to lose their usable rate delivery capabilities if they are recharged when only partially discharged.

Nickel-iron batteries are also being considered, but it must not be overlooked that they were used at least as early as the Second World War to power submarines when running under water. Moreover, nickel-iron batteries tend to produce hydrogen gas, requiring very special ventilation, and creating explosive conditions. Still further, they are very heavy.

Even rechargeable alkaline manganese dioxide batteries are now being considered for electric vehicles. Bundles of very small cells are being assembled into batteries so as to provide high current delivery and high current recharge acceptance characteristics, which overcomes a shortcoming of such batteries in commercial cell sizes because they are not generally capable of high current delivery or high current recharge. Batteries made from rechargeable alkaline manganese dioxide cells also overcome the shortcomings of similar nickel-cadmium batteries in that they do not have any memory effects, and are not nearly so likely to exhibit overheating characteristics, especially during any recharge which is not precisely controlled. However, rechargeable alkaline manganese dioxide batteries are expected to be quite expensive in terms of the power density capable of being produced, and to have unacceptable cycle life.

Sodium-sulphur batteries will provide about three times the range of lead/acid batteries having the same weight. However, sodium-sulphur batteries must be maintained at temperatures of at least 315° C. in order to produce electricity, making them extremely hazardous in use. Moreover, to maintain sodium-sulphur batteries at those high temperatures requires extremely good insulation plus electrically powered heaters—which is wasteful of stored electrical energy in the battery, as well as making a requirement for external power when the vehicle is parked.

Accordingly, the automotive industry has generally decided to maintain its reliance on lead/acid batteries as a principal power source for electric vehicles, for a variety of reasons. First, lead/acid battery technology is well known and accepted by the public, since most automotive batteries are currently lead/acid batteries. Lead acid batteries are also well accepted as traction batteries for industrial vehicles such as fork lift trucks and the like, and for recreational vehicles such as golf carts. Moreover, lead/acid batteries can be designed to be essentially non-polluting if they are closed or sealed batteries operating in a gas recombinant mode. Such batteries require very little maintenance, if any. Still further, even the disposal of lead/acid batteries is less ecologically sensitive an issue than previously, because techniques now exist whereby substantially all lead in such batteries may be recovered and recycled. This reduces, if not virtually eliminates, landfill and ground water contamination problems.

Moreover, in general it is possible to design lead/acid batteries that are capable of delivering and receiving relatively high current densities, so as to meet the requirements of electric vehicle acceleration, regenerative braking, and fast charging. However, lead/acid batteries still have a number of problems to overcome, including the problems of energy density, and the unfortunate tendency of lead/acid batteries to lose active material from their plates - particularly at high current densities. If active material is lost from a plate, then obviously the current capacity of the battery will be reduced; and moreover, there exists a strong possibility that active material detaching from the plates may result in short-circuited cells.

All of the major automobile manufacturers of the world are devoting very substantial sums of money to the development of electric vehicles. Indeed, some of those electric vehicles are hybrids, which use small auxiliary power sources—such as a small gasoline engine—whose purpose is to charge the batteries of the vehicle—especially during long or extended trips taken by the vehicle. Unfortunately, at least in California, such vehicles may not be accepted after 1998 because it is mandated that after 1998 at least 2% of the vehicles sold in California by any manufacturer who sells more than 5,000 vehicles annually in that state must be zero-emission vehicles. That means that hybrid vehicles, while attractive, may only be a short-term solution towards fully electric vehicles—with the possible exception of hydrogen powered vehicles.

Regrettably, this once again raises the problem of the capability of lead/acid batteries to continually absorb deep discharge without degrading, especially over many cycles having rapid battery recharging.

Certain bipolar lead/acid batteries have been developed by Jet Propulsion Laboratory, in association with Johnson Controls Inc., particularly for the XA-100 and XA-200 hybrid electric vehicle projects. In a paper published in 1991 by Johnson Controls Inc., "The XA-200: Proposed Hybrid Electric Vehicle Using the Bipolar Lead/Acid Battery" by M. Eskra et al, bipolar lead/acid batteries are discussed. Hybrid vehicles incorporating the described batteries are driven using a three-phase AC induction motor and an inverter controller system, carried in the frame of a conventional automobile but replacing its engine. According to the Eskra et al paper, it was found in early experimentation that the lead/acid batteries needed to be optimized so as to operate under high power conditions, and that the lead/acid batteries were too large and too heavy. The battery requirements were for the battery to deliver 60 kW for 20 seconds, and to have about 7 kWh total energy capacity. The weight allowed is 365 Kg, thus providing for energy density of about 19.2 Whr/Kg. The battery voltage is now expected to be in the range of about 200 volts; and the cut-off voltage for the battery is set at 100 volts, after which the battery is recharged.

The Eskra et al paper was given at the ISATA conference, held in Florence, Italy, during May 1991. The paper describes a bipolar battery having positive and negative active surfaces that are mounted back-to-back on an electrically conductive substrate, with separators placed between the opposed electrode surfaces of opposite polarity. As with any bipolar battery, the current path is straight through the battery, and the voltage increases with each cell that the current passes through. The bipolar battery is made of a stack of bipolar plates, and the stack is created and sealed by thermally welding together the plastic edges that are formed on each of the bipolar plates. It must be noted that each plate consists of a reinforced plastic substrate, with two thin lead grids on either side of the substrate, and having active material pasted into the grids. Electric current is carried through the reinforced plastic substrate by physical connections that are made between the thin lead grids which are on either side. The battery operates in a sealed, gas recombinant mode, with oxygen that is produced at the positive electrode or positive side of each plate diffusing to the negative electrode or side of the adjacent plate, where it is reduced.

It should be noted, as well, that lead/acid batteries in keeping with the present invention may find usefulness in other circumstances than electrically powered vehicles. In particular, lead/acid batteries in keeping with the present invention will provide suitable high levels of energy density and power density, long cycle life and fast recharging rates, all of which are critical or particularly attractive for utilization of the batteries in electric vehicles. Moreover, because of those characteristics, it will also follow that for given parameters any lead/acid batteries of the present invention may have a smaller footprint or volume, lower weight, and longer float life, all of which are critical or at least desirable for circumstances such as standby power applications. Such uses may include uninterruptable power supplies, and other standby and/or critical load power systems.

It was noted above that the Eskra et al paper describes bipolar lead/acid batteries that are capable of providing energy densities of about 19.2 Whr/Kg. Lead/acid batteries in keeping with the present invention will provide at least three times that energy density—with an ultimate capacity in the range of 110 Whr/Kg—and bipolar batteries as described and noted hereafter will provide up to 110 Whr/Kg.

Indeed, a variety of related inventions that are all directed towards battery plates for lead/acid batteries are described or at least referenced, below. Several issues, therefore, to be discussed include the provision of battery plates for lead/acid batteries, wherein an increased exposed active surface area for each plate, with respect to its projected area, will be provided. Thus, battery plates in keeping with the present invention are more capable of providing high current rates, from which it follows that battery plates as provided herein will exhibit a high active material surface to volume ratio. Conversely, such battery plates provide a lower density per unit of active area of the battery plates. The exposed active surface area of the plate will be at least 150% of its projected area.

Reference will be made herein to the provision of battery plates whereby various surface treatment steps may be taken to provide for the increased active surface area. Thus, steps are described to provide the placement of lead, and the manner in which the lead surface may be worked or machined so as to provide an increased active surface area.

Moreover, the present discussion is also directed to methods whereby positive battery plates may be provided by providing for oxidation of a prepared lead surface. There is therefore a fully prepared positive plate or positive plate surface that is provided, and from that it follows that a formed battery will be provided when prepared negative lead plates and positive lead oxide plates are placed together with the appropriate confinement structures, electrolyte, etc. This therefore precludes any requirement for formation of positive battery plates after the battery has been manufactured, so that a manufactured battery is immediately ready to be placed in service without the necessity for post-assembly formation.

Other aspects to be at least referenced below include the provision of cored battery plates for lead/acid batteries. By providing a cored battery plate, where the core may be such as titanium, copper, chromium steel—possibly combined with copper—, or even silver, not only will the weight of the battery plate be reduced compared with battery plates that are comprised solely of lead or at least that have a lead supporting structure, battery plates will be provided by the present invention that have a higher current handling capability during charge and discharge.

Still further, the teachings of the present invention, especially as they may relate to cored battery plates, may be applied to the provision of bipolar batteries. That means that batteries having high rate and high energy capacity to volume ratios may be provided. Moreover, it will be evident that the methods of surface preparation, and methods of oxide formation, will be equally applicable to bipolar plates.

OBJECTS OF THE INVENTION

Accordingly, it is the principal purpose of the present invention to provide methods for fabricating battery plates for use in lead/acid batteries, where each battery plate is a discrete plate having a thin layer of lead at its active side, which lead may be at least partially oxidized to form a lead oxide surface if the battery plate is to be a positive battery plate, and where in any event the lead surface has been surface treated so as to form a plurality of closely spaced depressions therein and thereby so as to increase the exposed active surface area of the discrete plate. Ideally, the exposed active surface area of the discrete plate is at least 150% of the projected area of the plate.

A further purpose of the present invention is to provide a variety of methods whereby, when the plate is to be used as the positive plate in a lead/acid battery, lead oxide may be formed in situ on an already existing thin layer of lead that has been placed on that surface of the battery plate.

Still further, the present invention provides a variety of methods whereby the thin layer of lead may be formed in the first instance over the surface of the plate.

DESCRIPTION OF THE PREFERRED EMBODIMENTS

Figure 1:
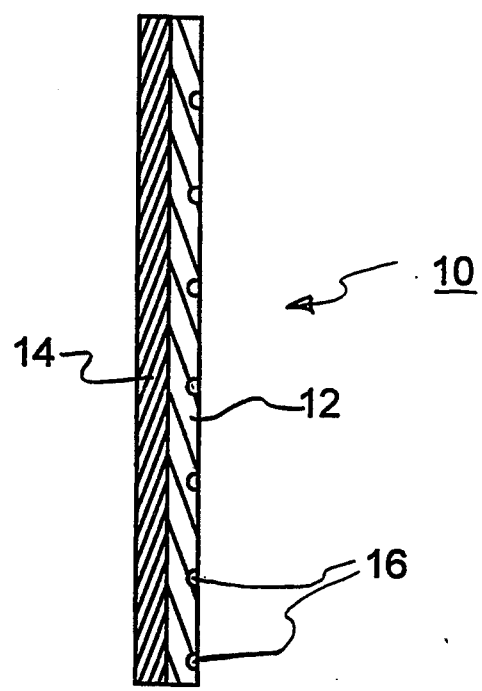
FIG. 1 which accompanies this disclosure, is an idealistic representation of a battery plate in keeping with the present invention.

Battery plates are fabricated in keeping with the present invention for use in lead/acid batteries. Each such battery plate will exhibit a high active surface area when compared with its projected area. Moreover, the principal active constituent of each battery plate that is fabricated in keeping with the present invention is elemental lead or lead oxide, depending on its use as a negative plate or a positive plate.

The present invention provides that, in its broadest terms, the fabricated battery plate is prepared in keeping with the following steps:
 (a) producing a thin layer of lead;
 (b) forming a discrete plate unit so as to include the thin layer of lead at the active surface of the discrete plate; and
 (c) surface treating at least the thin layer of lead of the thus defined discrete plate unit. If the plate is to be a positive plate, it is treated in such a manner so as to form a plurality of closely spaced depressions therein. By following this step, the exposed active surface area of the discrete plate unit is increased to at least 150% of its projected area. On the other hand, if the plate is ultimately to be a negative plate, it is surface treated so as to form a plurality of shallow depressions in which tin plated lead powder, for example, may be placed for later processing to provide a suitable lead surface.

In its ideal sense, because it functions as a current conductor—either as a current source or a current collector—an ideal battery plate should have negligible electrical resistance. Moreover, the ideal battery plate should have a very high ratio of exposed active surface area to its gross or projected area. Still further, of course, the bond between the chemically active material at the surface of the battery plate and any underlying material that functions as its physical support and/or its current collector should maintain both its mechanical strength and its electrical conductivity—no localized high resistivity—under varying conditions including severe mechanical and/or electrical stress conditions.

Typically, the plate of a prior art lead/acid battery comprises a grid which is formed or cast from lead, and which supports an active paste. The lead of the grid may be alloyed with an agent such as antimony or calcium. However, as noted above, prior art plates are notorious for their demonstrated tendency to lose good contact with portions of the active material paste—which paste is forcibly placed into the voids formed by the grid. Moreover, the material of the grid may present some resistivity to current flow, and in any event the structure is heavy. There is therefore some likelihood of electrical resistance and/or a mechanical fault resistance which may affect the ability of the plate to give up electrical energy in high discharge current conditions—or to absorb electrical energy in high charge current conditions.

For any battery plate, if there is an increased surface area of the active material of the plate, then there is a greater opportunity for energy transfer at the solid/liquid electrolyte/gas interface. That means, of course, that the battery will give up electrical energy as current, or accept electrical energy as current, at higher current rates. In order to increase the surface area, in keeping with the present invention, the thin layer of lead is surface treated in a manner so as to form a plurality of closely spaced depressions in the surface. If, for example, those depressions are formed so as to be conical in shape and to have a diameter at the base of the cone of 0.001 inches with a maximum depth of 0.0025 inches, then when those cavities are placed at a pitch of 0.0012 inches in an orthogonal pattern, there will be an area multiplication in the range of 7.5—that is, there will be an exposed active surface area of approximately 750% of the projected area. Such conditions may be acceptable for thin lead plates having relatively short service life expectancies. A still further example may comprise conical holes which have a diameter at their base of 0.0025 inches and a depth of 0.0025 inches. If hexagonal close packed geometry is used for placement of the holes, and the conical cavities are each 0.0035 inches on center-to-center spacing, then the effective surface area multiplication is about 2. That means that the exposed active surface area will be about 200% of the projected area of the plate. However, the specific placement and configuration of depressions is one which is a matter of choice, depending on the grade of lead, for example, whether the battery is going to be intended to provide and accept very high charge and discharge current, the spacing between plates and the thickness allowed for each plate, and so on.

In keeping with the principles discussed about, it is an intended design criterion of the present invention that the active material of the plates should be thin. This is so whether the active material is on the negative plate or the positive plate—or the negative plate side or positive plate side of a bipolar electrode. As discussed, any attempt of prior art batteries to incorporate thin plates has, however, compromised the ruggedness of the battery and therefore its life. Moreover, an increased surface area will provide for a lower current density. The need for surface treating the thin layer of lead so as to increase the exposed active surface area thereof therefore becomes quite evident.

The above discussion concerning the provision of an increased surface area in a thin layer of lead assumes, generally, a crystal structure scale, with respect to the lead, of about 0.005 inches. Obviously, effective surface area multiplication is affected to some extent by consideration of pore closure—that is, the crystal structure scale. Smaller pore structures will essentially be obliterated when the crystal structure scale is below about 0.005 inches, so that the geometry by which effective surface area multiplication is determined is not necessarily scale independent below 0.0035 inches. However, in general, the procedures by which a thin layer of lead is produced, and the procedures by which the thin layer of lead is surface treated, all as described herein, can be taken from their context to be applicable to the specific steps being described.

The manner in which the surface treating may be carried out may vary, and may be one of choice depending on the availability of the required equipment, the capital costs for such equipment, the production requirements, and so on. In any event, it may simply be said that a first appropriate manner for surface treating the thin layer of lead may be by embossing the lead. This may be carried out using embossing rollers. Indeed, it may be necessary that the embossing rollers might have to be chilled, rather than being heated as might otherwise be expected. This comes because lead is very ductile, and cold flow of lead will occur at quite modest pressures. Therefore, excellent detailing of the embossing pattern in the plate is assured, but at least the exit rollers may have to be chilled to ensure that there is no further flow of the lead.

Alternatively, the surface treatment may be carried out using a carbon dioxide laser which will produce infrared light. Lead is an efficient optical absorber, particularly for infrared light, so that the energy requirements for surface treating may be relatively low.

As an example, it is calculated that a 1000 watt laser will melt 0.0035 inch depth of a 20 inch wide lead sheet, at six linear inches per second. This assumes 50% overall optical efficiency. Accordingly, laser micro-machining of the surface of the lead layer on the plate is easily attained.

It should also be noted that a thin layer of lead may be produced on a substrate such as that of lead calcium, especially where the lead layer be prepared will be the negative plate lead matrix. In this case, the thin layer of lead may be formed by sintering a low melting point alloy which comprises essentially lead together with an alloying agent—usually tin—in a form such as a tin coated lead powder, so as to form a eutectic composition of the lead on the substrate. That procedure of alloy migration sintering is fully described in co-pending application Ser. No. 07/781,835 filed Oct. 24, 1991 by the inventor Feldstein, herein. That patent application is commonly assigned to Derafe, Ltd., and is incorporated herein by reference.

Reference is made to several other patent applications filed simultaneously herewith, in the name of the inventor Feldstein, and also commonly assigned to Derafe, Ltd. The first application is Ser. No. 08/074,365 entitled CORED BATTERY PLATES FOR LEAD-/ACID BATTERIES and is now U.S. Pat. No. 5,339,873. The methods of surface treating and oxidizing battery plates where a thin layer of lead is produced in the first instance may be employed in following out the teachings of that application. Likewise, the methods of surface treating as they are described herein are applicable in carrying out the teachings of a further application Ser. No. 08/074,360 entitled BIPOLAR LEAD-/ACID BATTERIES.

Two further applications are application Ser. No. 08/074,361 entitled INTEGRAL BATTERY ELECTRODE STRUCTURE FOR LEAD/ACID BATTERIES, and Ser. No. 08/704,747 entitled INTEGRAL ELECTRODE STRUCTURES HAVING FILLER ADDITIVES, may also find usefulness of the present invention in carrying out their teachings.

Other manners in which a thin layer of lead may be produced on the battery plate, are now discussed:

Essentially, there are a number of means by which the thin layer of lead may be produced. They include the simple steps of casting a thin film of lead, or extruding a thin film of lead. However, thin films of lead are, themselves, difficult to handle, so a substrate such as a very thin sheet of lead calcium or lead antimony might be used. Indeed, other light weight materials which, themselves, would be substantially chemically inert in a battery might be used as a substrate. It is also recognized that placing lead layers on a substrate has particular relevance to methods of preparation of bipolar battery plates. However, this discussion is directed to battery plates which may be negative plates or positive plates, including plates which may be required to be used as end plates in bipolar batteries so as to provide equal numbers of facing positive and negative plates in a cell. In any battery, the plates are separated by an appropriate separator which will contain and effectively confine the acid electrolyte in the battery cell.

FIG. 1 shows a typical plate 10, which may be either a negative plate or a positive plate. The plate comprises a thin layer of lead 12, and a substrate 14. The placement of the layer of lead 12 on the substrate 14 is discussed herein. The surface of the lead layer 12 may have a number of indentations or other depressions 16 formed therein, as discussed herein.

In any event, if a substrate is going to be used for the preparation of the plate, its surface will be prepared, at least by precleaning. Then, lead may be ion implanted into the prepared substrate surface, followed by plasma arc spraying. Control of the acceleration voltages of the plasma arc will be carried out using conventional techniques. Additional lead might, in fact, also be placed such as by sputtering lead onto the then placed first lead layer, or by co-extrusion.

Indeed, it may be preferred for lead to be placed on the prepared substrate surface first by ion implantation—by which monatomic lead is placed on the substrate. Lead may then be further placed by plasma arc spraying, and if necessary by co-extruding, which may then permit alloying of the lead surface. At the same time, particularly with co-extrusion, surface treatment such as by the use of embossing rollers may be effected.

Moreover, it should be noted that even while the initial placement of lead is being carried out, as discussed above, the lead may be alloyed with small amounts of fluorine—for example, fluorine may be present in the amount of about 100 p.p.m. The placement steps to deposit sufficient amounts of lead may be a plurality of steps, such as plasma arc spraying followed by co-extruding lead; and successive layers may change slightly in their specific compositions. Also, the chemistry between successive layers may vary, and the gradients between the layers be controlled by quenching and/or annealing the structure between the steps taken to place successive layers. The presence of fluorine alloyed in the lead in low concentrations, as noted, tends to decrease any likelihood of successive layers of lead corrosively delaminating from one another.

Reference is made, once again, to the matter of surface treatment such as by micro-machining, rolling and embossing, etc.

First, it must be kept in mind that the surface of a negative plate that is provided in keeping with the present invention is one which is essentially a thin layer of lead. The surface of the positive plate is essentially a thin layer of lead oxide which is formed in place in keeping with a feature of the present invention as described below. Once a very thin layer of lead is prepared, as on a substrate, then the essentially pure lead negative surface may be prepared such as by alloy migration sintering as noted above with respect to copending application Ser. No. 07/781,835. Alternatively, as noted, the lead surface may be extruded onto a substrate. If the surface is to be finally arrived at such as by alloy migration sintering, then the initial very thin extruded lead surface may have large and shallow depressions rolled into it. Thereafter, the low melting alloy or tin plated lead powder may then be pressed into the shallow depressions, followed by the alloy migration sintering step. Indeed, to prepare for the alloy migration sintering step, tin may be plasma sprayed onto the surface to provide the alloying tin required, thereby giving the wetting agent required for the alloy migration sintering process.

When the battery plate being manufactured is to be utilized as a positive plate, the surface of the lead is first textured sufficiently deeply that a good lead oxide matrix structure will then be developed in the manner described hereafter. It should be noted, however, that a lead oxide crystal web will provide a stable structure. Moreover, the lead oxide surface of the positive plate is essentially a mixed lead oxide system, so that in any event a crystalline structure will be developed which will not by structurally or functionally different than the lead oxide structure of prior art battery plates.

When the lead surface intended to be used on the positive lead oxide plate is textured, the texturing provides a plurality of depressions that must be deep enough so that a reaction region by which the lead oxide is created, and at which the charge/discharge reactions of the battery will later take place, will be created. This is especially necessary because the lead oxide structure must be preserved during recharging procedures for the battery.

Consideration is now given to the steps to be taken when the plate is to be used as the positive plate in a lead/acid battery. This requires, of course, that the further step of oxidizing the thin layer of lead be undertaken. Because the processes for oxidizing may vary, as discussed below, it is important that at least a portion of the thin layer of lead be oxidized at any one time; moreover, for the reasons discussed above, it is not necessary nor intended that there be a very deep depth of oxidation of the thin layer of lead because the additional depth beyond easily determined limits, depending on the purposes for which the lead/acid battery will be intended—provides no real further advantage. Thus, once again, it is important that at least a portion of the thin layer of lead is oxidized, so as to form the lead oxide coating as the active surface of that battery plate.

Several methods for oxidizing the lead are proposed by the present invention. The first method is carried out by surface melting the thin layer of lead, while the lead surface is exposed to an oxygen-rich atmosphere. Once again, the surface melting may be accomplished such as by the use of a carbon dioxide laser which produces infrared light. If the surface melting is carried out in an oxygen-rich atmosphere, and thereafter the surface melted lead is permitted to cool while still exposed to the oxygen-rich atmosphere, then there will be formed at least a surface layer of lead oxide. It is usual, in this case, that the process be carried out in a pressurized oxygen-rich atmosphere, where the positive gauge pressure may range from part of an atmosphere to, perhaps, two or three atmospheres.

Another method for creating the lead oxide surface may be carried out by oxygen ion implantation. This step is achieved by directing an oxygen plasma at at least a portion of the surface of the thin layer of lead at any instant in time. Indeed, relatively thick oxide layers may be formed—in the range of, say, 0.0035 to 0.0015 thousandths of an inch using this technique. This is accomplished by subjecting a high acceleration voltage between the oxygen plasma source and the target—the thin layer of lead—at that instant in time, whereby the oxygen ions which initially impact the lead will be deeply embedded in the lead. Moreover, once the initial oxygen ions are in place at or below the surface of the lead, crystal growth of lead oxide will occur, because of expansion due to the reduced specific gravity of lead oxide compared to elemental lead—and therefore the surface will open up to make the underlying material accessible to the oxygen plasma. In any event, lead oxide crystal formation will continue, although the oxide formation may become slower as the oxide layer thickens. The acceleration voltage of the oxygen ion plasma will be gradually reduced as the ion implantation gradually results in a growing lead oxide layer. Moreover, initially the thin layer of lead may be heated to a temperature that is below the melting point of lead, to promote lead oxide formation in the first instance.

Of course, it must not be overlooked that there are many specific lead oxides, the analysis or determination of which are readily apparent. However, it follows that because there are many lead oxides, the choice of specific lead oxides in certain circumstances may be important, by which their crystallography and morphology are likewise important. Having regard to the above, however, the control and choice of crystallography and morphology can be determined, within much closer criteria of choice, than would be possible for example with paste formation of lead oxide.

In some circumstances, it may be desirable to alloy the thin layer of lead that is formed in the battery plates in keeping with the present invention. An agent such as calcium or antimony may, for example, be alloyed with lead as it is extruded onto the plate structure. Other hardening agents apart from calcium and antimony may also be chosen. In any event, especially when antimony is chosen, the "work function" barrier height may be altered, thereby permitting a further choice in the design of battery plates in keeping with the present invention by which the intended use of the battery may be predetermined and specifically designed for. Also, cadmium—which is less mobile than, for example, calcium—may be employed in low concentrations as a gas suppressant. Moreover, up to 1% concentration of tin may be alloyed with the lead as an anti-corrosion agent.

It may also be desired that lignin, which is derived from Norway pine and which is used as an expander, may be sprayed onto the plates if needed. If so, the lignin would be dissolved in an organic solvent such as benzene or acetone.

In summary, the placement of lead or lead alloy may be carried out by a variety of methods and steps, including plasma spraying and ion implantation, co-extrusion, and so on.

Where the negative plate surface is formed by alloy migration sintering, and to aid in area multiplication of the lead surface for the negative plate formation, the first layer of lead is pre-patterned to accept the coated lead powder that will be used in the alloy migration sintering step. That may include the step of placing shallow depressions or "tubs" to contain the coated lead powder which will ultimately be placed so as to form the sponge lead surface for the negative plate. When the positive plate is manufactured, such as by programmed oxygen ion implantation on a pre-formed lead surface, with the time and current density and accelerator voltage parameters being controlled to provide the morphology required—the porosity, grain size, and crystallography of the lead oxide to be formed—the surface of the lead is pre-textured so as at least to increase the exposed active surface to at least 150% of its projected area. Forming conical depressions may require a lead thickness at least in the order of 0.050 inch.

When the preparation of the battery plate includes co-extrusion, that may take place over a number of successive steps where successive layers are added by being extruded through successively larger extrusion dies. There may be some interdiffusion at the layer interfaces due to the heat and the molten state of the lead layer being laid down; and post-extrusion quenching and annealing will permit the successive layers to remain essentially intact and preclude delamination. Surface geometry modifications such as by cold-flow embossing, as well as other conventional manufacturing steps may take place. However, alloy migration sintering of negative plate material and ion implantation conversion of lead to lead oxide for the positive plate material, are the preferred techniques.

There has been described methods of fabricating battery plates for use in lead/acid batteries. Those battery plates may be positive plates or negative plates. The battery plates of the present invention, in any event, will have an exposed active surface area which is at least 150% of its projected area. A variety of methods of fabricating, at nearly each step during the entire fabrication process, have been discussed. The scope of the invention, however, is determined by reference to the accompanying claims.

What is claimed is:

1. A method of fabricating a battery plate for use in lead/acid batteries, where said battery plate exhibits a high active surface area when compared with its projected area; and
   wherein the principal active constituent of said battery plate is elemental lead or lead oxide; said method comprising the steps of:
   (a) producing a thin layer of lead;
   (b) forming a discrete plate unit so as to include a substrate and said thin layer of lead at its active surface; and
   (c) surface treating at least the thin layer of lead of said discrete plate unit so as to form depressions therein.

2. The method of claim 1, wherein the crystal structure scale of said thin layer of lead is about 0.005 inches.

3. The method of claim 1, wherein said thin layer of lead is produced by sintering an alloy comprising lead together with an alloying agent which will form a eutectic composition with lead onto said substrate.

4. The method of claim 1, wherein step (c) comprises embossing said thin layer of lead.

5. The method of claim 1, wherein step (c) is carried out so as to form a plurality of closely spaced depressions therein and thereby so as to increase the exposed active surface area of said discrete plate unit to at least 150% of its projected area.

6. The method of claim 5, wherein step (c) comprises micro-machining said thin layer of lead with a laser.

7. The method of claim 5, wherein, when said plate is to be used as to the positive plate in a lead/acid battery, said method comprises the further step of:
   (d) oxidizing at least a portion of the thin layer of lead so as to form a lead oxide coating as the active surface of said battery plate.

8. The method of claim 7, wherein step (d) is carried out by causing at least surface melting of said thin layer of lead while said surface is exposed to an oxygen-rich atmosphere, and thereafter allowing the at least surface melted lead to cool while still exposed to said oxygen-rich atmosphere so as to thereby form at least a surface layer of lead oxide.

9. The method of claim 8, wherein said surface melting is carried out by directing the output of an infrared laser at at least a portion of the surface of said thin layer of lead at any instant in time, in the presence of said oxygen-rich atmosphere.

10. The method of claim 7, wherein step (d) is carried out by oxygen ion implantation by directing an oxygen plasma at at least a portion of the surface of said thin layer of lead at any instant in time.

11. The method of claim 10, wherein said oxygen plasma is, at first, subjected to a high acceleration voltage between its source and the at least a portion of said thin layer of lead that is its target at that instant in time, and by subsequently gradually reducing said acceleration voltage as the ion implantation of said oxygen ions gradually results in a growing lead oxide layer.

12. The method of claim 10, wherein said thin layer of lead is initially heated to a temperature below the melting point of lead.

13. The method of claim 1, wherein said thin layer of lead is produced by one or more the group of steps consisting of casting a thin film of lead, extruding a thin film of lead, plasma arc spraying lead onto a prepared surface of a substrate, ion beam implantation of lead ions onto a prepared surface of a substrate, and ion beam implantation of lead ions onto a prepared surface of a substrate followed by plasma arc spraying lead onto the ion implanted lead ions.

14. The method of claim 13, followed by extruding a further very thin layer of lead onto the already existing placed lead surface.

15. The method of claim 1, wherein, when necessary, said thin layer of lead is hardened by being treated with a hardening agent chosen from the group consisting of calcium and antimony.

16. The method of claim 1, wherein, when necessary, said thin layer of lead is sprayed with lignin which is dissolved in an organic solvent.

17. The method of claim 1, wherein the crystal structure of said thin layer of lead is such that its pore closure scale is at least 0.005 inches.

18. The method of claim 15, whereby the "work function" barrier height of said thin layer of lead may be altered by the addition of a predetermined amount of antimony as an alloying agent together with said lead.

19. The method of claim 3, wherein said alloy of lead together with an alloying agent further includes up to 100 p.p.m. of fluorine.

* * * * *